(12) United States Patent
Doran

(10) Patent No.: US 6,959,627 B2
(45) Date of Patent: Nov. 1, 2005

(54) SECURITY FASTENER, SYSTEM FOR CONNECTION AND METHOD THEREFOR

(76) Inventor: Jeffrey Doran, 209 Southside Ct., Fort Collins, CO (US) 80525

( * ) Notice: Subject to any disclaimer, the term of this patent is extended or adjusted under 35 U.S.C. 154(b) by 0 days.

(21) Appl. No.: 10/643,458

(22) Filed: Aug. 18, 2003

(65) Prior Publication Data

US 2004/0079204 A1   Apr. 29, 2004

Related U.S. Application Data

(60) Provisional application No. 60/405,195, filed on Aug. 21, 2002.

(51) Int. Cl.[7] .............................................. F16B 41/00
(52) U.S. Cl. ..................... 81/121.1; 411/402; 411/910
(58) Field of Search ..................... 81/121.1; 411/427, 411/402, 403, 405, 910, 911

(56) References Cited

U.S. PATENT DOCUMENTS

| | | | |
|---|---|---|---|
| 4,018,111 A | * | 4/1977 | Goldhaber .................... 81/436 |
| 4,352,614 A | * | 10/1982 | Hirsch ......................... 411/427 |
| 4,742,702 A | * | 5/1988 | Swertz .......................... 70/231 |
| 4,841,838 A | | 6/1989 | Scully et al. |
| 5,401,133 A | * | 3/1995 | Kuchler ....................... 411/402 |
| 6,039,524 A | * | 3/2000 | McKinlay .................... 411/149 |

FOREIGN PATENT DOCUMENTS

EP   253496 A1 * 1/1988   ........... F16B 41/00

* cited by examiner

*Primary Examiner*—David B. Thomas
(74) *Attorney, Agent, or Firm*—Timothy J. Martin; Michael R. Henson; Rebecca A. Gegick

(57) ABSTRACT

A security device and fastener is used in a security system and method. The device has a body portion with a base, an outer surface, a cylindrical cavity and an inner radial flange defining a bolt hole that is coaxial with the cavity. The sidewall of the cavity is sized to have reduced radial clearance between a standard bolt head and a standard wrench socket to prohibit removal of the bolt except with a specially configured socket. The fastener includes this device and a nut and bolt combination. The system includes the fastener and the specialty wrench tool. The security device can be formed as part of a fixture that is adapted to secure a sign to a support, such as a post. The method includes the steps of providing a security device as disclosed, providing a specialty socket and securing a plurality of items together therewith.

20 Claims, 5 Drawing Sheets

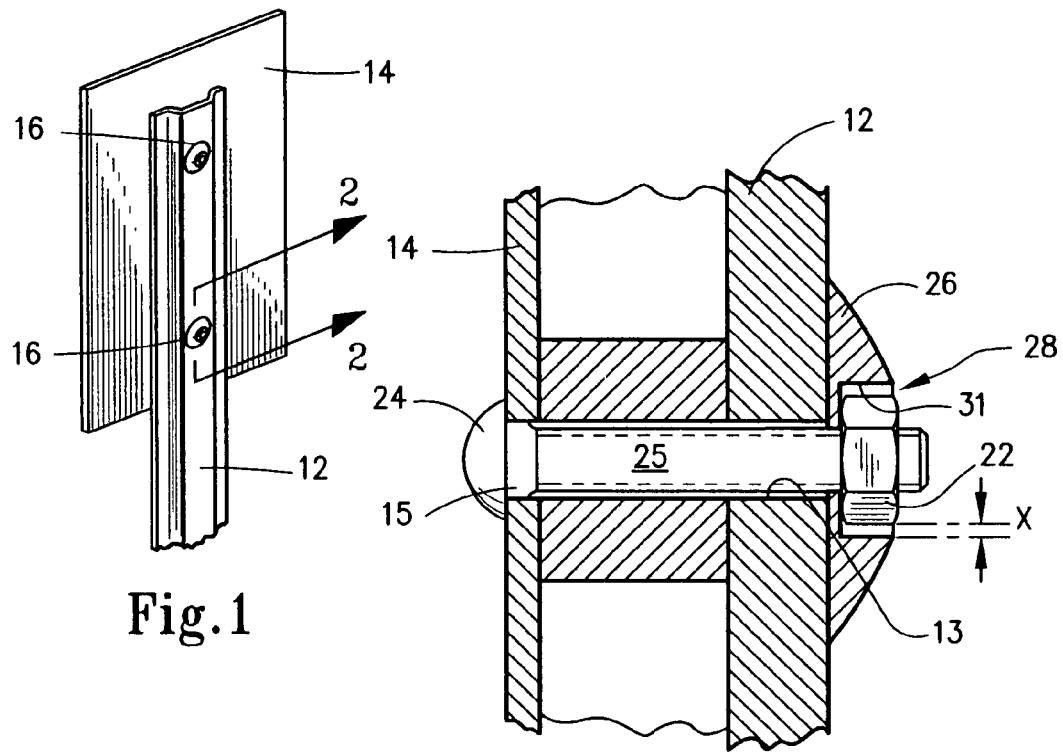
Fig.1
Fig.2
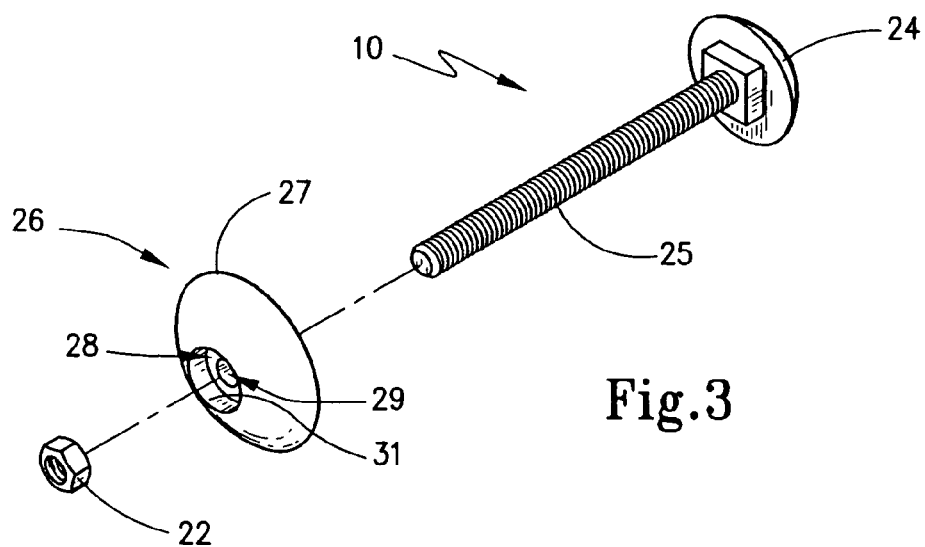
Fig.3

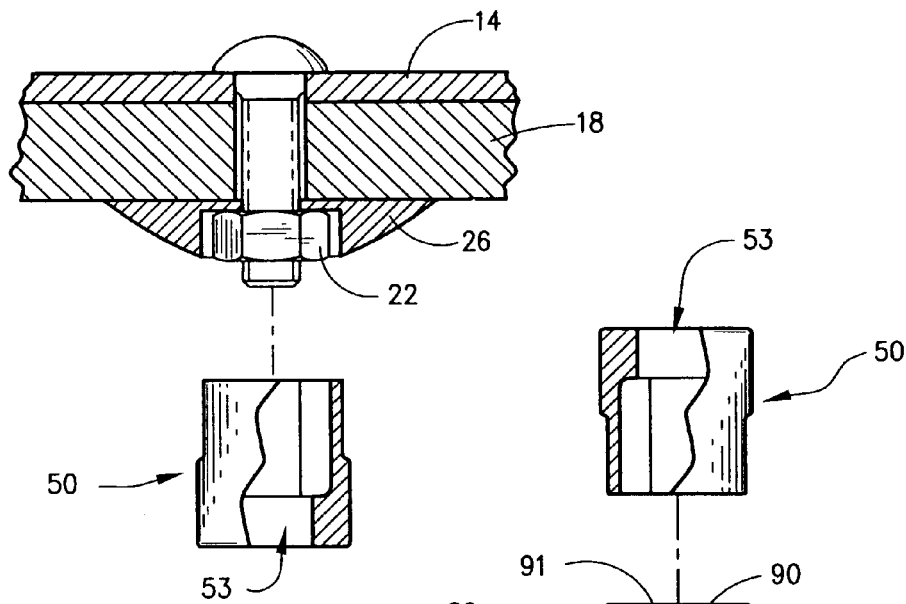
Fig.8
Fig.9
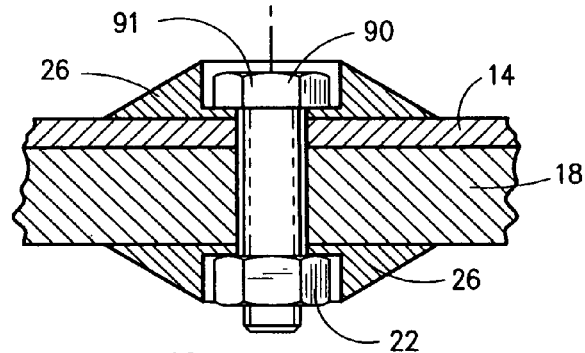
Fig.10
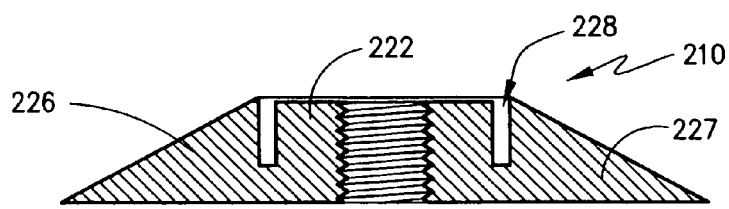
Fig.12

SECURITY FASTENER, SYSTEM FOR CONNECTION AND METHOD THEREFOR

CROSS REFERENCE TO RELATED APPLICATIONS

This application claims the benefit of U.S. Provisional Application No. 60/405,195 filed Aug. 21, 2002.

FIELD OF THE INVENTION

The present invention broadly relates to fasteners that are used to connect one item to another. More specifically, however, the present invention concerns a security fastener that deters unauthorized removal of a fastener. The invention also concerns a system and method incorporating such a security fastener. The security fastener of the present invention particularly relates to a security washer that can be used with traditional nut and bolt sets.

BACKGROUND OF INVENTION

The need to secure items one to another has existed since before the beginnings of civilized societies. Today, one of the most commonly used fasteners for joining several structural members together is the threaded bolt and nut. These fasteners, being widely used in many applications, are now commonly mass produced in various standard sizes at a relatively low cost.

A bolt has a head and a cylindrical threaded body that extends from the head. The head can be of various shapes, such as hexagonal, square or domed, and the threaded body can be of various lengths. The nut that mates to the bolt is generally hexagonal or square in shape and has a corresponding threaded through hole. Threaded fasteners such as hex-head bolt and nut sets or carriage bolt and nut sets allow the separation of the affixed parts by using commonly available standard wrenches, sockets and similar tools to undo the fasteners. Because of common availability of such tools, the unauthorized tampering with exposed nuts and bolts in public areas is a significant and ongoing problem.

Sheet metal signage is commonly used for advertisement and traffic control. These consist of sheet metal signs mounted on vertical posts or on flat vertical surfaces. These signs have become popular targets for theft and vandalism. Such theft and vandalism create many problems for society. They range from missed directions for motorists, property loss due of replacement to fatal traffic accidents. For example, many municipalities annually spend thousands of dollars each just to replace vandalized traffic control signs. Moreover, there have been instances where the unauthorized removal of stop signs at a busy intersection caused a vehicle collision resulting in the loss of human life.

In order to address the potential of vandalism of signage, some municipalities have resorted to connecting the signs to their support posts by means of non-releasable rivets. While this makes removal of the sign difficult to potential vandals or thieves, it unfortunately makes removal difficult for authorized personnel as well.

An anti theft technology taught by U.S. Pat. No. 4,841,838 permanently attaches a frusto-conical collar circumjacent to a hexagonal bolt head after the bolt is installed, thus rendering the bolt head not accessible to wrenches or similar tools. In order to turn the bolt head, the frusto-conical collar must be cut away with a torch first. This again limits access by authorized personnel.

In an effort to provide security fasteners that are readily removable by authorized personnel but not vandals, several technologies have been invented that require a non-standard bolt or nut which require non-standard tooling to rotate such non-standard bolt or nut thus limiting access to such bolt or nut to personnel in possession of the non-standard tooling. Here the non-standard bolts and/or nuts are expected to cost much more than the mass-produced standard nuts and bolts thus rendering them uneconomical for the application.

Therefore, there is a need to develop fasten systems for sheet metal signs that are not easily accessible to the general public and yet allow authorized personal to remove and/or replace the signs with relative ease. The present invention intends to provide such a system of security fastener utilizing low cost standard bolt and nut sets.

SUMMARY OF THE INVENTION

It is an object of the present invention to provide a new and useful security device and fastener, along with a system and method utilizing such a security devices and fasteners, where the fastener releasably joins two or more structural parts together.

It is another object of this invention to provide a security fastening system which employs standard bolt and/or nut sets.

It is yet another object of this invention to provide a security fastening system which deters unauthorized access to the standard bolts and/or nuts.

It is yet another object of this invention to provide a security fastening system that employs a non-standard wrench socket to turn the standard bolts or nuts.

Still a further object of the present invention is to provide a security fastener, system and method that is relatively low in cost and that can be employed with existing signage structures.

According to the present invention, then, a security device is adapted for use with a selected bolt and nut combination in order to secure first and second objects to one another in order to prevent unauthorized removal of either the bolt or the nut by means of a wrench or other tool having a standard socket. Broadly, the security device includes a body portion that has a base, an outer surface and a cylindrical first cavity formed therein with a radially extending flange that defines a bolt hole that is coaxial with the first cavity such that the bolt hole is adapted to receive the shaft of the bolt. The first cavity has a depth that is at least about the thickness of the selected bolt head or nut and a cylindrical cavity sidewall that is sized to allow a selected finite radial clearance between the cavity sidewall surface and the maximum dimension of the bolt head or the nut. The radial clearance is selected to be smaller than the standard sidewall thickness of a standard socket.

Further, the body portion may have a frusto-conical outer surface that extends from the base at an acute angle in a range of about 10 degrees to 45 degrees. In one embodiment, a nut portion is disposed inside of the first cavity and is attached to the body portion. Here, the nut portion has a threaded bore that is coaxial with the bolt hole and is sized to threadably received the shaft of the bolt. This nut portion may be integrally formed with the body portion.

In another embodiment, the body portion may be constructed of a plastic material and includes a second cavity formed in the base that is coaxial with the bolt hole in the first cavity. A reinforcement element is disposed in the second cavity with this reinforcement element having an opening that is coaxial with the bolt hole and sized to receive that shaft of the bolt. The reinforcement element may be an annular metallic washer. If desired, the reinforcement element can be affixed to the body portion. In another embodiment, the body portion is of a two-piece construction including an inner core having the first cavity and an outer retainer operative to nestably receive the inner core.

This security device may be a component of a security fastener which includes a nut and/or bolt in combination with the security device as described above. This invention may also include a security fastener system using the security devices and fasteners as described above. Here, however, the system includes a specially wrench or tool for use with the nut and/or bolt combination. This specially wrench or tool includes a socket portion with an inner socket cavity formed by a plurality of longitudinal surfaces or grooves shaped to engage either the bolt head or the nut and a socket sidewall that surround the socket cavity. The socket sidewall has a minimum wall thickness which is sized to be equal to or less than the radial clearance between the cavity wall and the maximum dimension of the bolt head or the nut. Here, again, the body portion of the security device has a frusto-conical outer surface extending from its base at an acute angle, all as described above.

The present invention further contemplates a fixture that is adapted to secure a sign to a support structure by means of a selected bolt having a bolt head and a nut combination wherein one of the bolt head and the nut has a maximum dimension measured between diametrically opposite points and a selected thickness in order to prevent unauthorized removal of the bolt or nut by a wrench having a standard socket. The fixture includes a mounting portion that is adapted to be secured to a support structure and a first bracket portion. The first bracket portion has a bore therethrough that is adapted to secure the sign by means of the selected nut and bolt. The bracket portion includes a security structure disposed thereon. Here, again, this security structure includes a body portion having a cylindrical cavity formed therein that has a diameter that is greater than the bore and that is axially aligned with the bore. The cavity has a depth at least about the selected thickness of the bolt head or nut and a cylindrical cavity sidewall surface sized to allow a selected finite radial clearance between the cavity sidewall surface and the maximum dimension of the bolt head or nut with this radial clearance being smaller than that standard sidewall thickness of a standard socket.

In this embodiment, the security structure may be formed as a raised body with the raised body having an outer peripheral surface that, if desired, is frusto-conical. A nut portion may be again disposed inside the cavity with the nut portion having a threaded bore that is sized to threadably receive the shaft of the bolt. If desired, one or more pairs of aligned security structures may be disposed on the bracket portion so that a bolt having a hex head along with a hexagonally shaped nut may be used with the pair with the security structures thus protecting both the bolt head and the nut. The mounting portion may be defined by a second bracket portion adapted to secure to an edge of a sign. Alternatively, the mounting portion may be defined by a cup shaped socket adapted to secure to a cylindrical post. Naturally, other mounts are contemplated within the scope of this invention. In any event the mount, such as a second bracket or a cup-shaped socket may itself have a security structure of similar construction to that described above.

According to the present invention, then, a method for securing two or more items together with a selected bolt and nut combination is disclosed. This method includes any of the steps contemplated by the security device and security fastener of the present invention. Broadly, the method includes a step of providing a security device that includes a body portion that has a cavity formed by a cavity a sidewall that is adapted to receive a standard size nut or hex bolt in such manner that there is insufficient clearance between the cavity sidewall and the nut or bolt head to permit engagement by a standard socket of a standard size. The method then provides a special socket that has an engagement opening sized to mateably engage the standard nut or bolt but with a reduced wall thickness to fit within an annular space between the cavity sidewall and the nut or bolt head received therein. The method then contemplates securing the items together with a selected bolt and nut combination with one of the bolt head and nut positioned in the cavity and tightened therein by means of the special socket.

These and other objects of the present invention will become more readily appreciated and understood from a consideration of the following detailed description of the exemplary embodiments of the present invention when taken together with the accompanying drawings, in which:

BRIEF DESCRIPTION OF THE DRAWINGS

FIG. 1 is a perspective view of a sheet metal sign secured to a metal post in accordance with a first exemplary embodiment of the present invention.

FIG. 2 is an enlarged cross sectional view taken about lines 2—2 of FIG. 1.

FIG. 3 is an exploded perspective view of the security fastener of the present invention.

FIG. 5($b$) is a bottom end view of the standard drive socket shown in FIG. 5($a$).

FIG. 6($b$) is a bottom end view of the thin wall drive socket in FIG. 6($a$)

FIG. 7($b$) is a bottom end view of the modified standard drive socket of FIG. 7($a$).

FIG. 8 is an exploded side view in cross-section showing a modified socket about to engage the nut attached to a carriage bolt in an assembled security fastener system.

FIG. 9 is an exploded side view in cross-section showing a modified socket about to engage the bolt head attached to a hex nut in an assembled security fastener system.

FIG. 10 is an exploded side view in cross-section showing the two components of a frusto-conical washer according to a second exemplary embodiment of the security washer of the present invention.

FIG. 12 is a side view in cross-section showing yet another embodiment of the present invention where a nut is formed integrally with the safety washer.

DETAILED DESCRIPTION OF THE EXEMPLARY EMBODIMENTS

Figure 4:
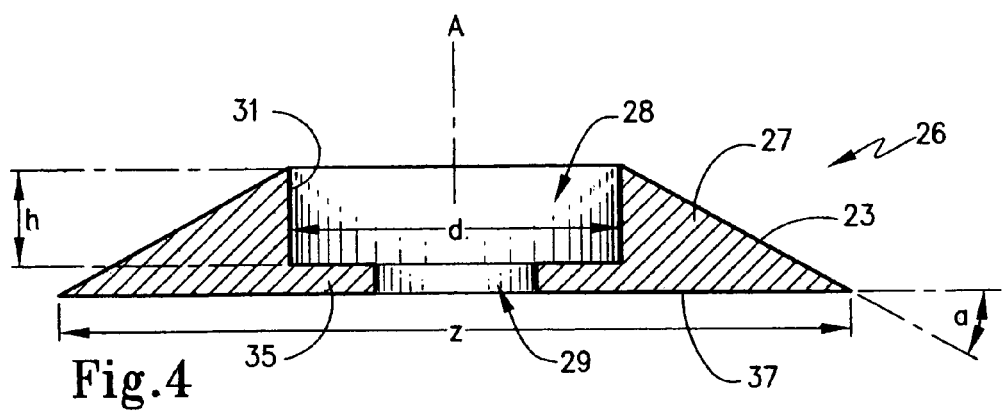
FIG. 4 is a cross sectional view of a first exemplary embodiment of the frusto-conical washer according to the present invention.

The present invention relates to a security device that is adapted for use with a selected bolt and nut combination in order to secure first and second objects to one another. This security device, when combined with a bolt, provides a security fastener that prevents unauthorized removal by a wrench having standard sized socket. Accordingly, the present invention also includes a security fastener system including the security fastener and the specialty wrench tool used to interact with the fastener. The security device of the present invention can be disposed on a bracket-like structure so as to form a fixture that may be used, for example, to secure a sign to an upright support post or to another sign. The present invention also contemplates a method implementing the steps according to the described structure.

As is known, a standard socket has a plurality of longitudinal grooves or surfaces on its inner surface shaped to engage the bolt head or nut on one end while the other end has a non-circular orifice to engage a standard drive handle. The outer surface of the standard socket is cylindrical and smooth. Because the radial clearance in the present invention is so chosen that a standard socket cannot enter the cylindrical cavity to engage the bolt head or nut in the cavity, commonly available standard sockets cannot be used to take apart the system.

To turn the bolt or nut in the system, a special wrench socket is used with a standard wrench drive handle. The special socket has the same internal configuration as a standard socket but has smaller outside diameter thus has a thinner wall thickness than a standard socket, i.e., with its thinnest wall section equal to the radial clearance between the cylindrical cavity wall and the maximum diameter points of the bolt head or nut and length of socket is at least the depth of the cylindrical cavity of the frustro-conical washer. To rotate the bolt or nut of the system, the special socket is inserted into the cylindrical cavity of the washer where its internal driving grooves or surfaces of the socket engage the bolt head or nut. The bolt head or nut of the system can now be turned by the socket which is turned using a standard socket drive handle.

With reference first to FIG. 1, a security device 16 according to a first exemplary embodiment of the present invention is shown attaching a sheet metal sign 14 to an upright post 12, with post 12 and sign 14 being of a standard type used in the industry. FIG. 2 illustrates an enlarged cross-sectional view taken about lines 2—2 of FIG. 1. In FIG. 2, it may be seen that a standard carriage bolt 24 includes a shaft 25 that is received through hole 15 of sign 14. Post 12 likewise has a hole 13 that aligns with hole 15 so as to receive shaft 25. The washer-like security device 26 also receives shaft 25, and a nut 22 is threadably received on the end of bolt 24 to secure sign 14 to post 12.

With reference to FIG. 3, the security fastener 10 according to the present invention includes the security device 26 along with bolt 24 and nut 22. Security device 26 is best shown in FIGS. 3 and 4 where it may be appreciated that body portion 27 has a flat base 37 and an outer surface 33 that is frusto-conical in configuration. Body portion 27 has a cylindrical cavity 28 formed therein with a radially extending flange 35 that has a centrally located bolt hole 29 that is co-axial with central axis "A" of cylindrical cavity 28. Cylindrical cavity 28 has a sidewall 31 that is of sufficient diameter and depth to allow receipt, for example, of nut 22 therein. Cavity 28, thus has a diameter "d" and an axial height "h", as is shown in FIG. 4.

Figures 5A, 5B, 7A:
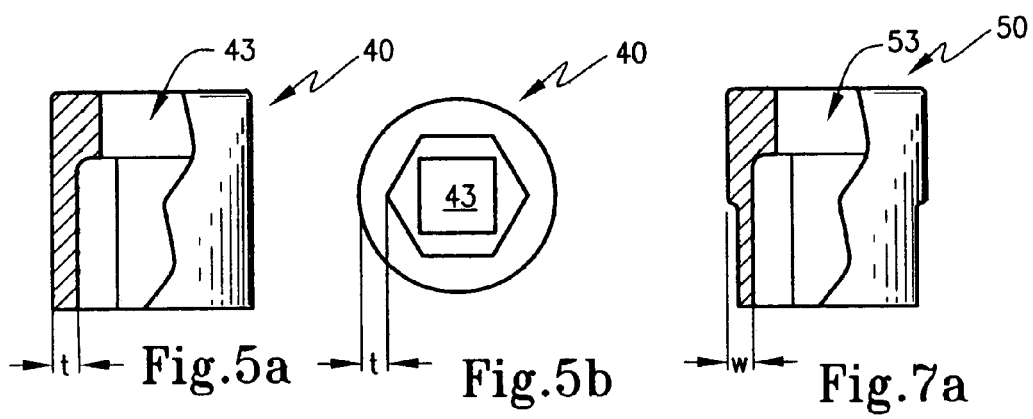
FIG. 5($a$) is a side view in partial section showing a standard drive socket according to the prior art.
FIG. 7($a$) is a side view in partial section view of a standard drive socket modified according to the security fastener system of the present invention.

As is known, a standard socket 40, as illustrated in FIGS. 5(a) and 5(b), has a plurality of longitudinal grooves or surfaces on its inner surface shaped to engage the bolt head or nut on one end while the other end has a non-circular orifice 43 to engage a standard socket drive tool. The outer surface of the standard socket is cylindrical and smooth. Because of the radial clearance in the present invention the diameter of the socket 40 relative to its wall thickness "t" prevents use of commonly available standard sockets to take apart the security fastener.

To turn the bolt or nut in the fastener system of the present invention, a specialty tool in the form of a wrench socket is used with a standard wrench drive tool. The special socket 60, FIGS. 6(a) and 6(b) has the same internal configuration as a standard socket but has smaller outside diameter chosen to be equal to or less than the diameter "d" of the cylindrical cavity 28, FIG. 4, of the security device 26, FIG. 2, with its thinnest wall section "v", FIG. 6(a), equal to or slightly less than the radial clearance "x" between the cylindrical cavity wall and the maximum diameter points of the bolt head or nut, as is shown in FIG. 2. The depth of this socket opening is at least equal to the depth "h" of the cylindrical cavity 28 in the body 27 of security device 26. Similar to the standard socket, the special socket 60 has a non-circular orifice 63 for engaging a standard socket drive tool.

Figures 6A, 6B, 7B:
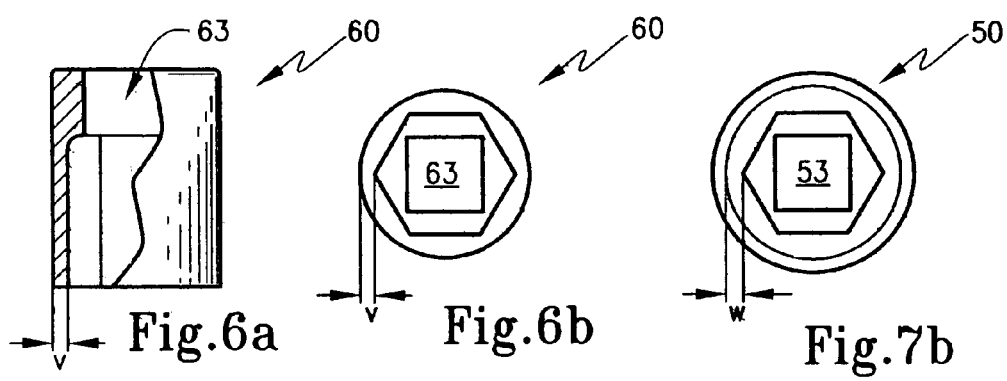
FIG. 6($a$) is a side view in partial section showing a special thin wall drive socket according to the security fastener system of the present invention.

Alternatively, instead of a special socket 60, a standard socket 40 may be modified to work as a special socket. With reference then to FIGS. 7(a) and 7(b), a modified standard socket 50 is depicted where a portion of the outside diameter is reduced by machining or otherwise to a smaller outside diameter. This smaller outside diameter is chosen to be equal or less than the diameter of the cylindrical cavity 28, FIG. 4, of the security device 26. The modified standard socket 50 has a thinnest wall section "w" equal to or slightly less than the radial clearance between the cylindrical cavity wall 31 and the maximum diameter points of the bolt head or nut "x". The length of modified section of the socket is at least equal the depth "h" of the cylindrical cavity 28 of the body portion 27. The modified socket retains the standard, non-circular orifice 63 for engaging a standard socket drive tool.

With reference to FIGS. 8 and 9, in order to rotate the bolt or nut of the system, the modified socket 50 is shown to be inserted into the cylindrical cavity 28 of the body portion 27. The internal driving grooves or surfaces of the socket may thus engage the bolt head or nut. The bolt head or nut of the system can now be turned via the non-circular orifice 53 of the socket which is rotated using a standard socket drive tool. Naturally, the special socket 60 could be used instead of modified socket 50.

Whereas FIG. 8 shows the security device 26 used with a standard carriage bolt and nut, FIG. 9 illustrates a mounting configuration that allows the use of a standard hex head bolt 90 with nut 22. In this application, security devices 26 are used to retain both the head 91 of hex head bolt 90 and the nut 22. Special or modified sockets 50 or 60 would then be employed to engage the head 91 and the nut 22 in order to assemble and disassemble the fastener 10.

Theft and vandalism of signs mounted with the present invention are deterred because commonly available standard socket wrenches cannot be use to turn the bolt or nut of the security fastener system. The angle of the sidewall 33 relative to base 37, when properly chosen, further makes it difficult if not impossible to turn it to drive the nut or bolt head, even with special pliers. Referring to FIG. 4, the angle "a" between the base 37 and the outer sidewall 33 of body portion 27 is chosen such that pinching and gripping tools such as Vise Grip and the like cannot grip the conical surface of the washer-like security device 26. Therefore a vandal cannot gain purchase on the conical surface of sidewall 33 in order to impart rotation to the bolt or nut situated therein.

A factor that determines the frusto-conical angle "a" is the desired maximum diameter "z" of the washer. Logically, given the same thickness of the device, the larger the desired maximum diameter "z" of the security device, the smaller the angle "a". In general, the angle between the base and the outer sidewall can be from 10 degrees to 45 degrees, although slightly larger angles may be suitable. An example of a workable range of angles for the illustrated security device 26 is in a range of about 30 to 45 degrees.

A first variation to the one piece security device is shown in FIG. 10. This frusto-conical washer assembly comprises two concentric circular metal parts, an inner core portion 102 that nests in an outer retainer portion 104 with a contact angle "b" which is less than 90 degrees. An example of a workable angle "b" is 60 degrees. The two portions, 102 and 104, when assembled, have the same shape as the above described one piece frusto-conical security device 26. This design allows and extra measure of safety from unauthorized access. If a vandal were able to get purchase on the outer retainer portion 104, say, with a pair of special pliers, and is thereafter able to rotate it, the inner core 102, being secured by the bolt head or nut can not be forced to rotate with the outer retainer 104. Another advantage of this construction is that the inner core 102 can be made of plastic with the outer retainer 104 of a harder material, such as metal.

Figure 11:
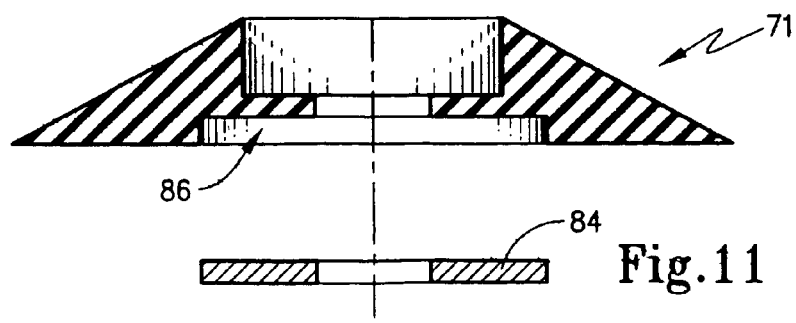
FIG. 11 is an exploded side view in cross-section showing a polymer frustro-conical washer and a metal flat washer according to a third exemplary embodiment of the security washer of the present invention.

In another embodiment of the security device is shown in FIG. 11. Here, the washer 71 is made of a polymer material, and a bottom concentric cylindrical cavity 86 is provided to accept a standard flat metal washer 84. When assembled, the metal washer 84 is inserted or molded into the cylindrical washer cavity 86. The metal washer provides a more rigid backing to the bolt head or nut, and thus it helps distribute the compressive loading of the security fastener system. The use of polymer material enables the frusto-conical washer 71 to be more corrosion resistant and enables the economical production of the part by using plastic part production technology such as injection molding and the like.

Another embodiment of the present invention is depicted in FIG. 12. In this embodiment, security device 226 includes a body portion 227 that has a cavity 228 formed therein. A nut portion 222 is disposed in cavity 228 and may be fabricated integrally with body portion 227 in a one-piece construction. This eliminates the need for a separate nut 22, yet still permits the security device 226 to engage a standard bolt, such as bolt 24.

From the foregoing, it should also be appreciated that the present invention includes a safety fastener system. This system includes a security device selected from among the types described herein along with the special or modified socket tools shown in FIGS. 6(a,b) and 7(a,b).

The security devices described in the above embodiments are independent of the brackets or other mounting structures with which they are used. It should be appreciated, though, that a security structure similar to security device 26 may be formed on mounting brackets so as to create a fixture that, for example, may be used to secure a sign to a support structure by means of a standard bolt, such as carriage bolt 24. A first such fixture, then, is shown in FIGS. 13–16. In these figures it may be seen that a fixture 310 may be used to mount a sign 312 onto an upright post 314. Fixture 310 has a mounting portion in the form of a cup shaped socket 316 that has an interior 318 sized for close fitted, mated engagement with an upper end portion of post 314. Here, interior 318 is cylindrical for use with a cylindrical post 314, although it should be understood that socket 316 could have any suitable interior sized to receive a post of varied geometric cross-section.

Figure 13:
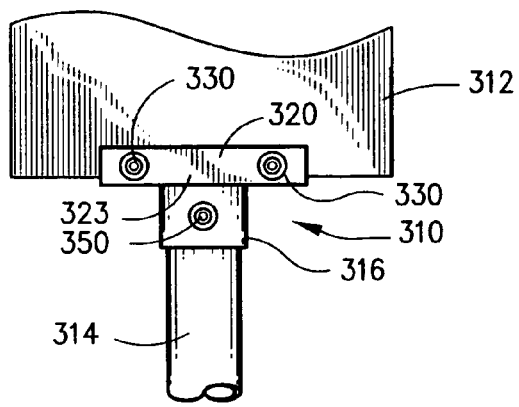
FIG. 13 is a side view in elevation showing the security fastener according to another embodiment of the present invention incorporated with a first type of fixture to support a sign.
Figure 14:
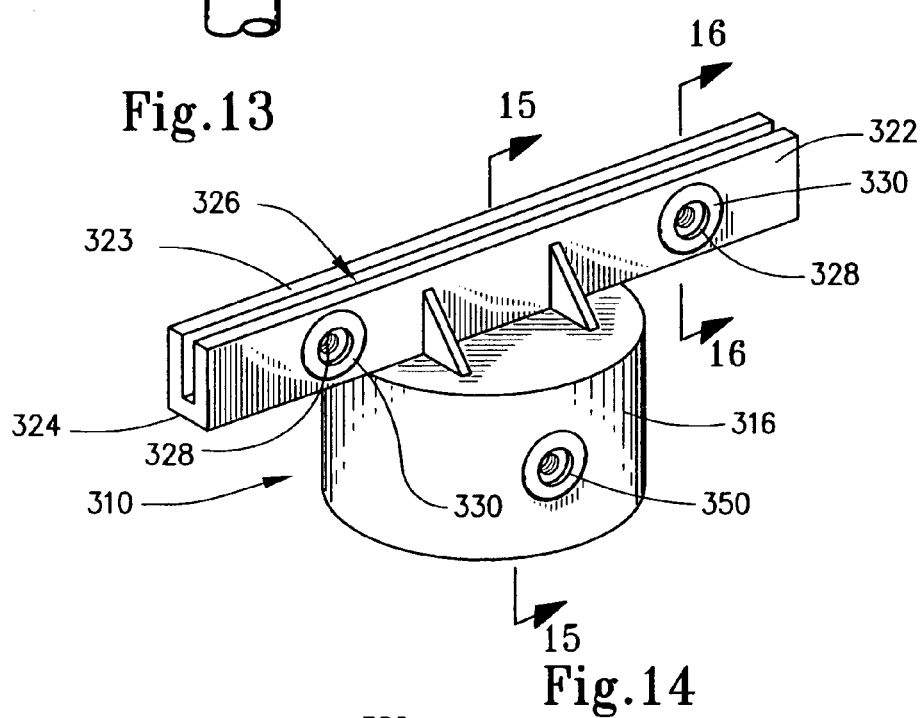
FIG. 14 is a perspective of the fixture of FIG. 13.

A first bracket portion 320 is formed integrally with socket 316 or otherwise secured to socket 316. First bracket portion 320 includes a pair of parallel spaced apart wall portions 322 joined by a web 324 so as to create a channel 326 therebetween. Channel 326 is sized to receive an edge margin of sheet metal sign 312 as illustrated in FIG. 13.

In order to mount sign 312 in channel 326, bracket portion 320 is provided with bores, such as bores 328, that receive a standard bolt head and nut. These bores 328 are shown to be co-axial with a security structure disposed on bracket portion 320. In this illustrated embodiment, four such security structures 330 are illustrated on bracket portion 320, with there being two security structures on each of wall portions 322 and 323. Each security structure 330 on wall portion 322 is coaxially aligned with a respective security structure 330 on wall portion 323 to form pairs of security structures with respect to each bore 328. Each security structure 330 is constructed similarly to each other and similarly to security device 26.

Figure 15:
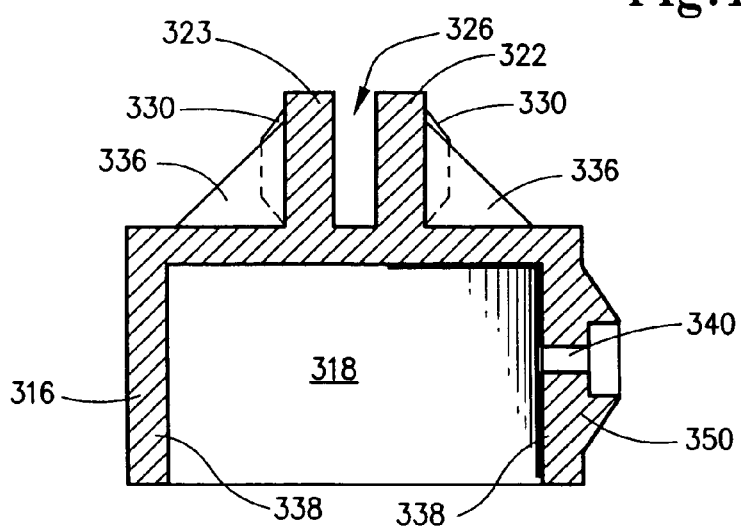
FIG. 15 is a cross-sectional view taken about lines 15—15 of FIG. 14.
Figure 16:
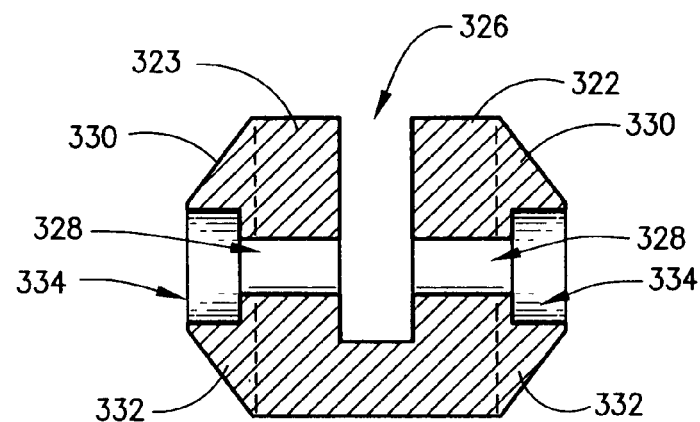
FIG. 16 is a cross-sectional view taken about lines 16—16 of FIG. 14.

Thus, as is shown in FIGS. 15 and 16, each security structure 330 includes a body portion 332 having a cylindrical cavity 334 formed therein. Cavities 334 have a diameter that is greater than bore 328 and is axially aligned with a respective bore 328. Each of cavities 334 further has a depth at least about the selected thickness of a bolt head and nut to be used therewith. The cylindrical cavity sidewall surface of cavities 334 are further sized to allow a selected finite radial clearance between the cavity sidewall surface and the maximum dimension of the bolt heads and nuts. This radial clearance is then selected to be smaller than the standard sidewall thickness of a standard socket. In this manner, the specialty sockets described above may be employed with a standard nut and bolt combination while a standard socket may not be used to attach or remove the sign 312 therefrom. It should be understood that one security structure 330 of each pair is not necessary if the fixture 310 is to be used with carriage bolts.

With reference now to FIG. 15, it may be seen that bracket portion 320 is supported on socket 316 by means of brace pieces 336. Moreover, if desired, the attachment of socket 316 to post 314 may be accomplished by a fastening bolt extending through a bore 340 in sidewall 338 of socket 316. Bore 340 may again be protected by a security structure, such as security structure 350, the configuration of which is the same as security structure 330.

Figure 17:
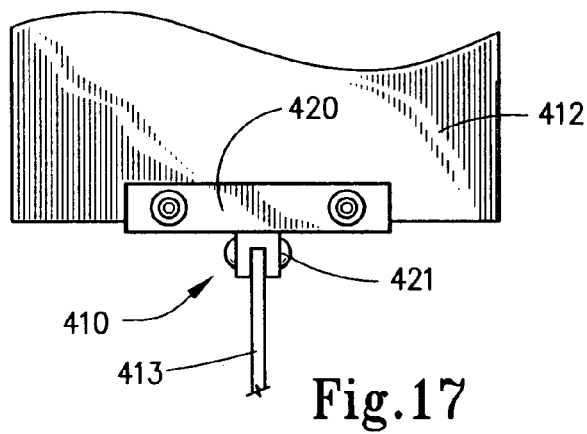
FIG. 17 is a side view in elevation showing the security fastener according to another embodiment of the present invention incorporated with a second type of fixture to support a sign.
Figure 18:
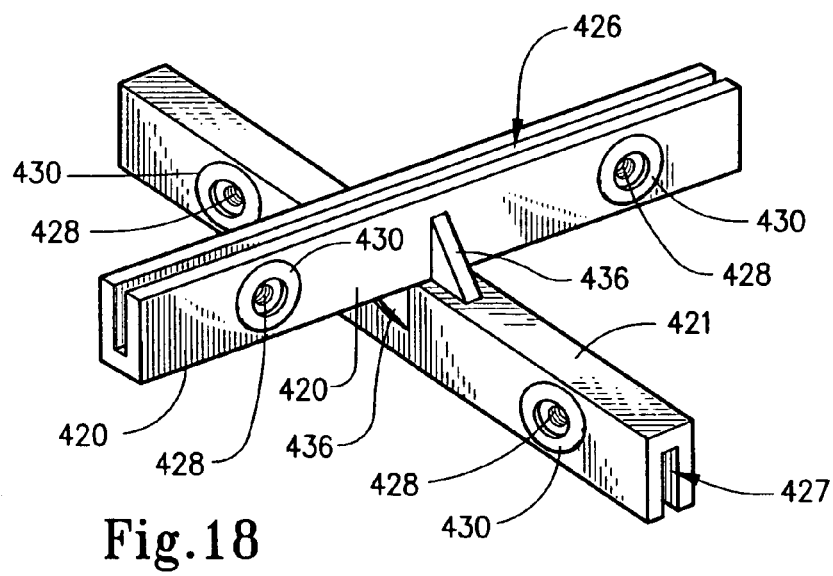
FIG. 18 s a perspective of the fixture of FIG. 17

Turning now to FIGS. 17 and 18, it may be seen that a second embodiment of the fixture according to the present invention is illustrated supporting a sign 412 relative to another sign 413. Here, fixture 410 includes a pair of bracket portions 420 and 421 with each of these bracket portions being constructed similarly to bracket portion 320 described above. This fixture 410 may be an integrally formed piece or, alternatively, bracket portions 420 and 421 can be affixed to each other in any convenient manner, such as by welding.

Here, each of brackets 420 and 421 are constructed similarly to bracket portion 320, so a description of that construction is not repeated. Bracket portions 420 and 421 have respective channels 426 and 427 that open oppositely one another to receive margins of signs 412 and 413. Bracket portions 420 and 421 are generally perpendicular to one another and are supported by brace pieces 436. Braces 420 and 421 are provided with suitable bores 428 to receive a nut and bolt combination. Here, again, each bore 428 is protected by a security structure 430 that is similar in construction to security structures 330 noted above.

From the foregoing, it should be appreciated that the present invention also contemplates a method for securing two or more items together with a selected bolt and nut combination. This method can include any steps that are inherent in the structure described above. Accordingly, the method contemplates securing two or more items together with a selected bolt and nut combination wherein the bolt has a bolt head and a threaded shaft a portion and where in one the bolt head and the nut has a maximum dimension measured between diametrically opposite points and a selected thickness. The method prevents unauthorized removal of the bolt nut by a wrench having a standard socket operative to mateably engage the bolt head or the nut.

This method, then, contemplates providing a washer like security device that includes a body portion that has a cavity formed therein that is adapted to receive a standard size nut or hex bolt in such manner that there is insufficient clearance between the cavity sidewall and the nut or bolt head received therein to permit engagement by a standard socket of a standard size. The method then provides a special socket having an engagement opening sized to mateably engage this standard nut or bolt head but with a reduced wall thickness to fit within an annular space between the cavity sidewall and another bolt head received therein. The method then includes the step of securing the items together with the standard selected nut and bolt combination with one of the bolt head and the nut positioned in the cavity and tightened therein by means of the special socket.

Naturally, the method could include providing pairs or axially aligned security devices so that a standard hex bolt and nut may be employed to attach the two items together. Alternatively, the method may include providing a security device only for the nut of the nut and bolt combination wherein the bolt is, for example, a carriage bolt or the like.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiments of the present invention without departing from the inventive concepts contained herein.

I claim:

1. A security device adapted for use with a selected bolt and nut combination in order to secure first and second objects to one another and wherein said bolt has a bolt head and a threaded shaft and wherein one of said bolt head and said nut has maximum dimension measured between diametrically opposite points and a selected thickness in order to prevent unauthorized removal of said one of said bolt and nut by a wrench having a standard socket operative to matably engage said one of said bolt head and nut wherein said standard socket has a standard sidewall thickness, comprising:

(A) a body portion having a base, a frusto-conical outer surface extending from said base at an acute angle and a cylindrical first cavity formed therein with a radially extending flange defining a bolt hole that is coaxial with the first cavity and that is adapted to receive the shaft of said bolt, said first cavity having a depth at least about the selected thickness and a cylindrical cavity sidewall surface sized to allow a selected finite radial clearance between the cavity sidewall surface and the maximum dimension of said one of said bolt head and nut, said radial clearance being selected to be smaller than the standard sidewall thickness of said standard socket.

2. A security device according to claim 1 wherein the acute angle is in a range of between about 10° and 45°.

3. A security device according to claim 1 including a nut portion disposed inside of said first cavity and attached to said body portion, said nut portion having a threaded bore that is coaxial with the bolt hole and sized to threadably receive the shaft of said bolt.

4. A security device according to claim 3 wherein said nut portion is integrally formed with said body portion.

5. A security device according to claim 1 wherein said body portion is secured to a fixture that is adapted to secure the first and second objects to one another.

6. A security fastener adapted to prevent unauthorized removal thereof by a wrench having a standard socket that has a standard sidewall thickness, comprising:

(A) a nut and bolt combination wherein said bolt has a bolt head and a threaded shaft and said nut is adapted to be matably threaded on said bolt wherein one of said bolt head and said nut has maximum dimension measured between diametrically opposite points thereof and having a selected thickness; and (B) a security device including a body portion having a base, a frusto-conical outer surface extending from said base at an acute angle and a cylindrical first cavity formed therein, said first cavity having a depth at least about the selected thickness and a cylindrical cavity sidewall surface sized to allow a selected finite radial clearance between the cavity sidewall surface and the maximum dimension of said one of said bolt head and nut, said radial clearance being selected to be smaller than the standard sidewall thickness of said standard socket.

7. A security device according to claim 6 wherein the acute angle is in a range of between about 10° and 45°.

8. A security device according to claim 6 wherein said body portion is constructed of a plastic material and has a second cavity formed in the base coaxially with the bolt hole and the first cavity, and including a reinforcement element disposed in the second cavity, said reinforcement element having an opening coaxial with the bolt hole and sized to receive the shaft of said bolt.

9. A security device according to claim 8 wherein said reinforcement element is an annular metallic washer.

10. A security device according to claim 8 wherein said reinforcement element is affixed to the body portion.

11. A security device according to claim 6 including a nut portion disposed inside of said first cavity and attached to said body portion, said nut portion having a threaded bore that is coaxial with the bolt hole and sized to threadably receive the shaft of said bolt.

12. A security device according to claim 11 wherein said nut portion is integrally formed with said body portion.

13. A security device according to claim 6 wherein said body portion is of a two-piece construction including an inner core having the first cavity and an outer retainer operative to nestably receive said inner core.

14. A security device according to claim 6 wherein said body portion is secured to a fixture that is adapted to secure the first and second objects to one another.

15. A security fastener system adapted to prevent unauthorized removal thereof by a wrench having a standard socket that has a standard sidewall thickness, comprising:
   (A) a bolt having a bolt head and a nut adapted to be matably threaded on said bolt wherein one of said bolt head and said nut has maximum dimension measured between diametrically opposite points thereof and having a selected thickness;
   (B) a security device including a body portion having a base, an outer surface and a cylindrical first cavity formed therein, said first cavity having a depth at least about the selected thickness and a cylindrical cavity sidewall surface sized to allow a selected finite radial clearance between the cavity sidewall surface and the maximum dimension of said one of said bolt head and nut, said radial clearance being selected to be smaller than the standard sidewall thickness of said standard socket; and
   (C) a specialty wrench tool including a socket portion with an inner socket cavity formed by a plurality of longitudinal surfaces or grooves shaped to engage said one of said bolt head and said nut and a socket sidewall surrounding the socket cavity, said socket sidewall having with a minimum wall thickness which is sized to be equal to or less than the radial clearance between the cavity wall and the maximum dimension of said bolt head or nut.

16. A security fastener system according to claim 15 wherein said body portion has a frusto-conical outer surface extending from said base at an acute angle.

17. A security device adapted for use with a selected bolt and nut combination in order to secure first and second objects to one another and wherein said bolt has a bolt head and a threaded shaft and wherein one of said bolt head and said nut has maximum dimension measured between diametrically opposite points and a selected thickness in order to prevent unauthorized removal of said one of said bolt and nut by a wrench having a standard socket operative to matably engage said one of said bolt head and nut wherein said standard socket has a standard sidewall thickness, comprising:
   (A) a body portion constructed of a plastic material and having a base, an outer surface and a cylindrical first cavity formed therein with a radially extending flange defining a bolt hole that is coaxial with the first cavity and that is adapted to receive the shaft of said bolt, said body portion having a second cavity formed in the base coaxially with the bolt hole and the first cavity, said first cavity having a depth at least about the selected thickness and a cylindrical cavity sidewall surface sized to allow a selected finite radial clearance between the cavity sidewall surface and the maximum dimension of said one of said bolt head and nut, said radial clearance being selected to be smaller than the standard sidewall thickness of said standard socket; and
   (B) a reinforcement element disposed in the second cavity, said reinforcement element having an opening coaxial with the bolt hole and sized to receive the shaft of said bolt.

18. A security device according to claim 17 wherein said reinforcement element is an annular metallic washer.

19. A security device according to claim 17 wherein said reinforcement element is affixed to the body portion.

20. A security device adapted for use with a selected bolt and nut combination in order to secure first and second objects to one another and wherein said bolt has a bolt head and a threaded shaft and wherein one of said bolt head and said nut has maximum dimension measured between diametrically opposite points and a selected thickness in order to prevent unauthorized removal of said one of said bolt and nut by a wrench having a standard socket operative to matably engage said one of said bolt head and nut wherein said standard socket has a standard sidewall thickness, comprising:
   (A) a body portion having a base, an outer surface and a cylindrical first cavity formed therein with a radially extending flange defining a bolt hole that is coaxial with the first cavity and that is adapted to receive the shaft of said bolt, said first cavity having a depth at least about the selected thickness and a cylindrical cavity sidewall surface sized to allow a selected finite radial clearance between the cavity sidewall surface and the maximum dimension of said one of said bolt head and nut, said radial clearance being selected to be smaller than the standard sidewall thickness of said standard socket, said body portion being of a two-piece construction including an inner core having the first cavity and an outer retainer operative to nestably receive said inner core.

* * * * *